US010530819B2

(12) United States Patent
Bharadwaj Shamarao Venkata Rao

(10) Patent No.: US 10,530,819 B2
(45) Date of Patent: Jan. 7, 2020

(54) VIRTUAL MACHINE SCREEN SHARING AND ACCESSING VIA SOCIAL MEDIA

(71) Applicant: VMWARE, INC., Palo Alto, CA (US)

(72) Inventor: Ajay Bharadwaj Shamarao Venkata Rao, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 643 days.

(21) Appl. No.: 14/014,433

(22) Filed: Aug. 30, 2013

(65) Prior Publication Data
US 2015/0067045 A1 Mar. 5, 2015

(51) Int. Cl.
*H04L 29/06* (2006.01)

(52) U.S. Cl.
CPC .................. *H04L 65/4038* (2013.01)

(58) Field of Classification Search
CPC ........... H04L 65/4038; H04L 29/08144; G06F 9/45533; G06F 9/50
See application file for complete search history.

(56) References Cited

U.S. PATENT DOCUMENTS

| 2008/0096176 A1* | 4/2008 | Rogers ................. G06Q 50/205 434/350 |
| 2009/0124387 A1* | 5/2009 | Perlman ................. A63F 13/12 463/42 |
| 2010/0299060 A1* | 11/2010 | Snavely ................. G06Q 10/02 701/533 |
| 2011/0087732 A1* | 4/2011 | Lakshmanan ......... H04L 67/303 709/204 |
| 2011/0184993 A1* | 7/2011 | Chawla ............... G06F 9/45533 707/802 |
| 2012/0110576 A1* | 5/2012 | Lin .......................... G06F 9/50 718/1 |
| 2012/0210247 A1* | 8/2012 | Khouri ................. G06Q 10/101 715/751 |
| 2012/0324358 A1 | 12/2012 | Jooste |
| 2013/0283171 A1* | 10/2013 | Schick .................. G06F 3/0481 715/733 |
| 2014/0181809 A1* | 6/2014 | Lvovsky ............. G06F 9/45558 718/1 |

* cited by examiner

*Primary Examiner* — William G Trost, IV
*Assistant Examiner* — Christopher P Cadorna
(74) *Attorney, Agent, or Firm* — Fish & Richardson P.C.

(57) ABSTRACT

Techniques for sharing and accessing VM screen via social media are described. In one example embodiment, a first user is allowed to log into the social media application via a browser in a client device at a first location. The first user is then allowed to select a feed type to share the VM screen in the client device at the first location. VM screen share information is then received from the first user via the client device at the first location. The VM screen is then shared upon receiving the VM screen share information from the first user via the client device at the first location.

31 Claims, 6 Drawing Sheets

VIRTUAL MACHINE SCREEN SHARING AND ACCESSING VIA SOCIAL MEDIA

BACKGROUND

Virtual machines (VMs) are software abstractions of computer hardware that run on a physical host computer system and function as self-contained platforms, running their own operating systems (OSs) and software applications. Virtualization management software (VMS) may provide a centralized and extensive platform for managing virtual machines within a virtual data center which can be a subset of a physical datacenter and/or span multiple data centers. Virtual data centers typically comprise multiple host computing systems that are managed by the VMS.

Virtual machines are often accessed remotely using various remoting protocols or systems in order to service or manage the applications or operating systems running on them. For example, patches may need to be applied, or software installed, updated, or reconfigured to accommodate changes in user or system requirements. Teams of administrators residing at disparate locations may work cooperatively to ensure various aspects of installed server applications, many of which may be distributed across numerous virtual machines in cluster, and/or in multitier configurations, are managed properly. Communications among team members may range from the use of email, instant chat, and telephone, to more modern social media environments often provided by enterprises to their employees. Examples of enterprise social media applications include Tibbr from Tibco, Yammer, and Socialcast. Such social media environments may be thought of as a private Facebook system that is accessible only to employees of the particular enterprise. Often it is necessary to share the graphical user interface (GUI) generated by a VM with team members.

Existing technologies allow the sharing of a GUI display from one system to another at distant locations. Well-known examples of such technologies are WebEx®, GoToMeeting®, or Skype®, available from Cisco®, Citrix®, and Microsoft®, respectively. These technologies require both the user sharing his or her desktop, and the user with whom the desktop is being shared to log into a special desktop sharing application, which can be inconvenient to initiate in the context of a social media interaction.

DETAILED DESCRIPTION

Embodiments described herein provide enhanced computer- and network-based methods, techniques, and systems for virtual machine (VM) screen sharing via social media. Example embodiments provide a virtual machine remote console (VMRC) browser plug-in residing in a user's system along with a VM screen sharing module residing in the social media that perform at least some of the described techniques. In one embodiment, the VMRC browser plug-in along with the VM screen sharing module allow a user to share a VM screen with other users coming on to the social media and also provide access to other users to the shared VM screen. There are various mechanisms available for providing computer graphics user interface display remoting through a browser, so details of such need not be described here. One example technique is described in U.S. Patent Application Publication 2012/0324358, which is incorporated herein by reference.

System Overview and Examples of Operation

Figure 1:
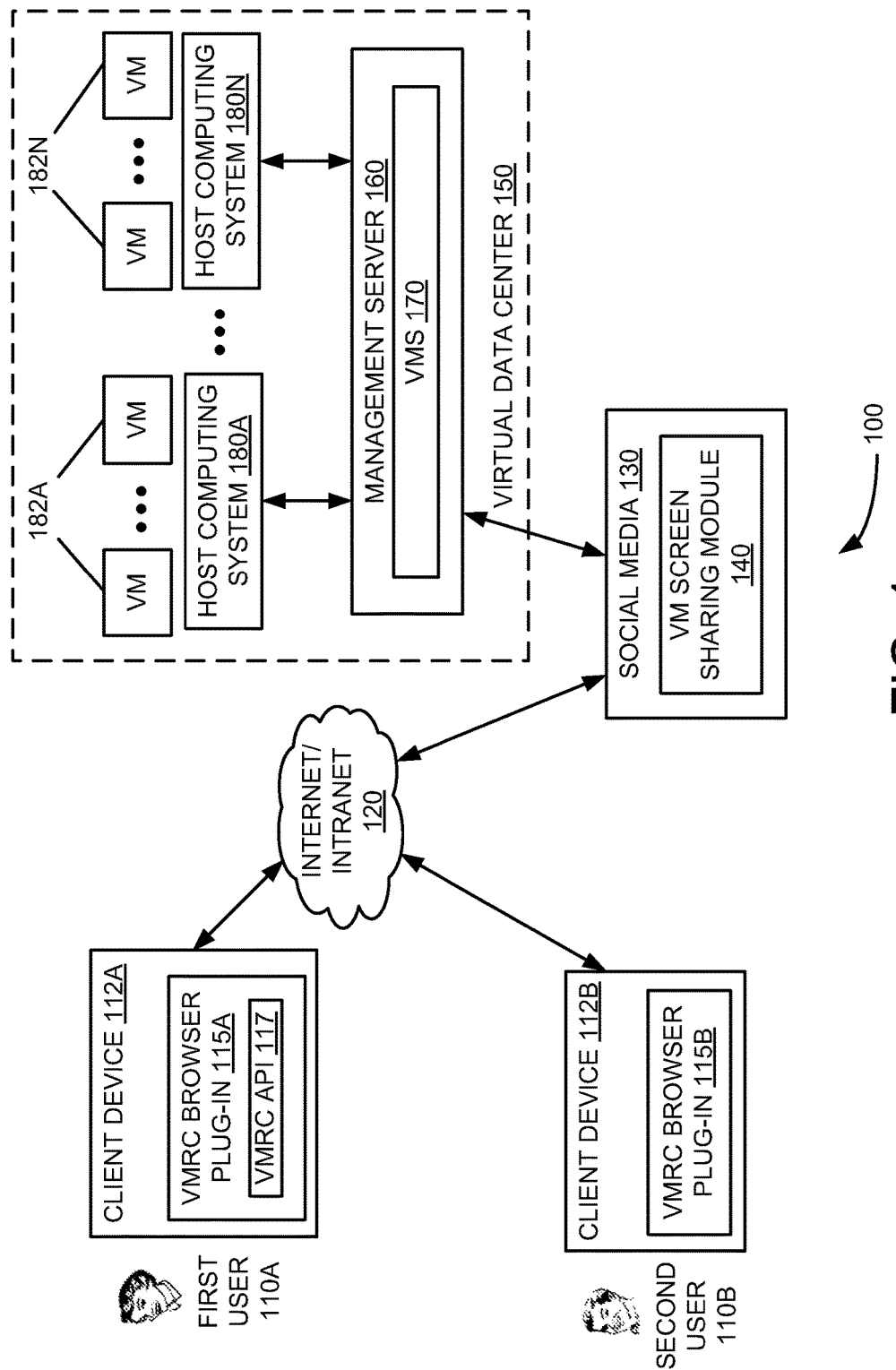
FIG. 1 is a block diagram illustrating major components of a system for virtual machine (VM) screen sharing and accessing via social media, according to an example embodiment.

FIG. 1 is a block diagram illustrating a system 100 for VM screen sharing via social media, according to an example embodiment. As shown in FIG. 1, virtualized datacenter 150 includes host computing systems 180 A-N and associated VMs 182 A-N hosted by host computing systems 180A-N. Also as shown in FIG. 1, virtualized datacenter 150 includes management server 160 that is communicatively coupled to the host computing systems 180A-N. Further as shown in FIG. 1, management server 160 includes virtualization management software (VMS) 170. Furthermore as shown in FIG. 1, system 100 includes social media application 130 that is communicatively coupled to virtual data center 150. Social media application 130 may execute in any convenient location, such as on a VM within virtual data center 150, on a VM within a different virtual data center (not shown) or elsewhere within the corporate firewall (not shown) or on servers managed by a third party outside the corporate firewall (not shown). Social media application 130 may include a screen sharing module 140 that resides in social media application 130 or is provided as an add-on or plug-in to social media application 130. VM screen sharing module 140 may also execute separately from but in coordination with social media application 130. Client devices located at first and second locations 112A and 112B associated with first user and second user 110A and 110B, respectively, are communicatively coupled to social media server 130 via Internet or Intranet 120. Each client device 112A, 112B includes associated VMRC browser plug-ins 115A and 115B, respectively.

In operation, first user 110A is allowed to log into social media application 130 via a web browser in client device at a first location 112A. Further, first user 110A is allowed to select a feed type on a webpage of the social media application 130 to share the VM screen via client device at the first location 112A upon successfully logging into the social media application 130 via the web browser. Example feed type is a default social feed, a news feed, a feed from one of a group or a private message section of social media application 130.

VM screen sharing module 140 is configured to receive VM screen share information associated with the VM from first user 110A via client device at the first location 112A upon first user 110A selecting the feed type on the webpage of the social media application. In some embodiments, VM screen sharing module 140 is configured to receive the VM screen share information in a form provided to first user 112A via client device at the first location 112A. Example VM screen share information is VM location information (e.g., a network address or other logical identifier), control access information, and/or time duration needed to share the VM screen. The VM location information may include a VM name, a VMS host name or an Internet protocol (IP) address, an organization name, a username, a password for VMS 170 and the like. The control access information may include view console only (i.e., read only) or view and access console (i.e., read/write). The terms, "VM screen" and "console" interchangeably refer to the graphical user interface (GUI), command-line interface, or other viewable and/or audible output generated by the target VM. Further in these embodiments, VM screen sharing module 140 may be configured to allow first user 112A to post an optional message along with the shared VM screen.

In some embodiments, VM screen sharing module 140 is configured to provide a pop-up including a hyper text markup language (HTML) form to include the VM location information, the control access information, and/or the time duration to share upon activating the share-console link. First user 110A then completes the form by including the VM location information, the control access information and/or the time duration to share the VM screen. VM screen sharing module 140 then allows first user 110A to submit the form to share the VM screen in the selected one of the default social feed, the feed from one of a group or the private message section of social media 130.

VM screen sharing module 140 then shares the VM screen upon receiving the VM screen share information from first user 110A via client device at the first location 112A. In some embodiments, VM screen sharing module 140 obtains a screen ticket from VMS 170. In some embodiments, the screen ticket is a string that includes VMs IP address and/or its managed object reference. In some embodiments, the screen ticket may be a string that is encoded as described in RFC 2396. In these embodiments, the screen ticket is a one-time credential used for establishing a remote mouse-keyboard-screen connection to a VM. VM screen sharing module 140 then sends the screen ticket onto VMRC browser plug-in 115A via VMRC application programming interface (API) 117. VM screen sharing module 140 then shares the VM screen upon receiving the VM screen share information from first user 110A and the screen ticket from the VMS. In some embodiments, VMRC API 117 may use an encrypted string, such as an alpha-numeric string based on the information filled in by the first user for the screen ticket. VMRC API 117 may specify screen size, full screen, input release and the like to control the use experience when viewing the shared VM screen. Input release option may disable mouse or keyboard input capture. In some embodiments, VMRC API 117 may be configured to provide a link or button to the users to change the screen size to full screen. VMRC API 117 may have functions to specify screen parameters, such as setFullscreen( ), setScreensize(width, height) and the like. VMRC API 117 may change the screen size to full screen once this link or button is activated by the users. The link or button may be provided in the web page by the social media and upon activating the link or button, VMRC API 117 is used to change the screen size to full screen using the API calls described above. The input release may be achieved by control access specified in the form while sharing the VM screen.

Second user 110B may access social media application 140 via a browser in client device at a second location 112B. VM screen sharing module 140 then determines whether there is VMRC browser plug-in 115B in the browser of client device at the second location 112B. If there is VMRC browser plug-in 115B in the browser of the client device at the second location 112B, VM screen sharing module 140 shares, using the screen ticket, the VM screen along with and as part of the first user's social feed. If there is no VMRC browser plug-in 115B in the browser of the client device at the second location 112B, VM screen sharing module 140 sends instructions to second user 110B to install the VMRC browser plug-in in the browser residing in client device at the second location 112B to access the shared VM screen.

Figure 2:
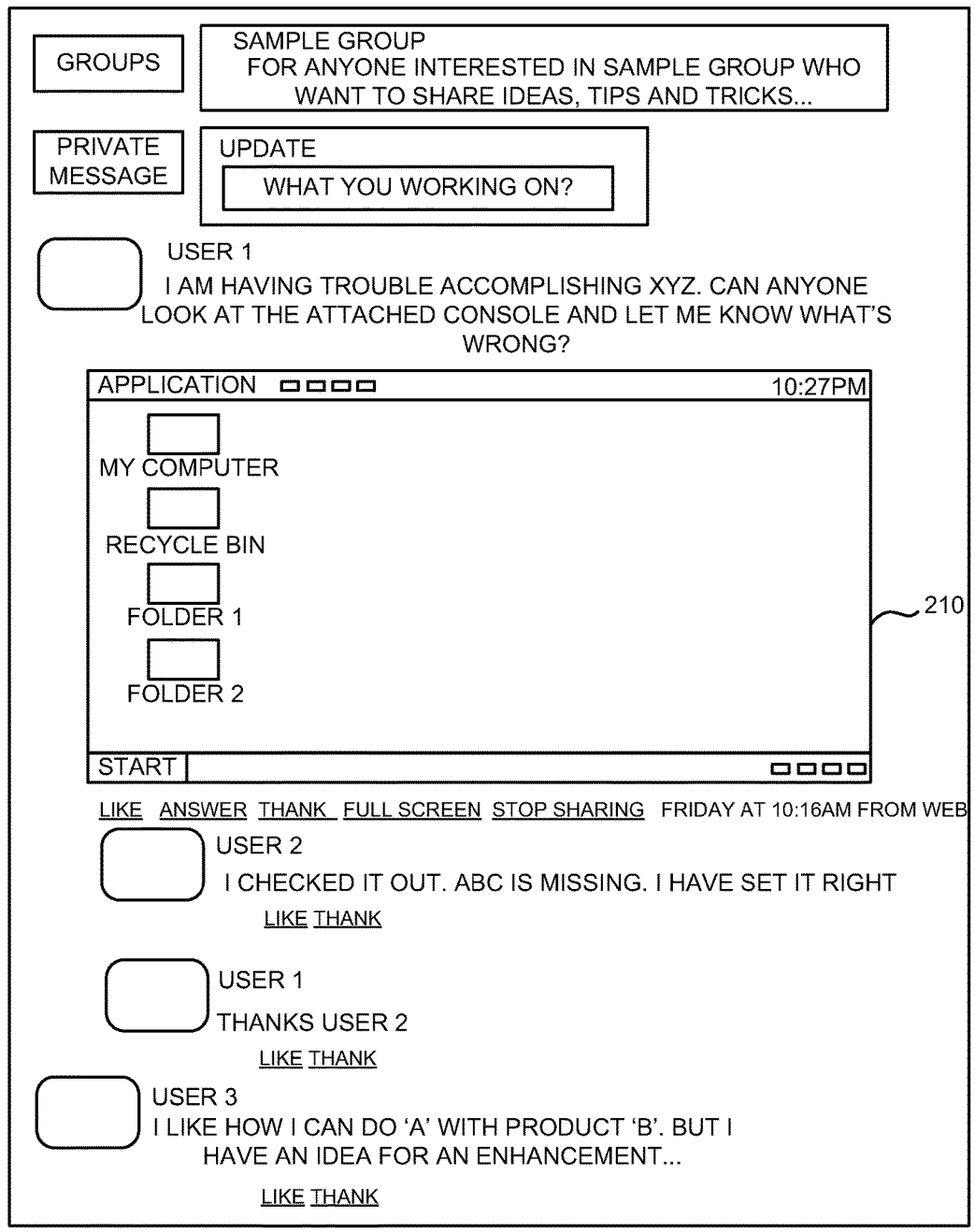
FIG. 2 is a screenshot showing a shared VM screen in a social stream of the social media, according to an example embodiment.
Figure 3:
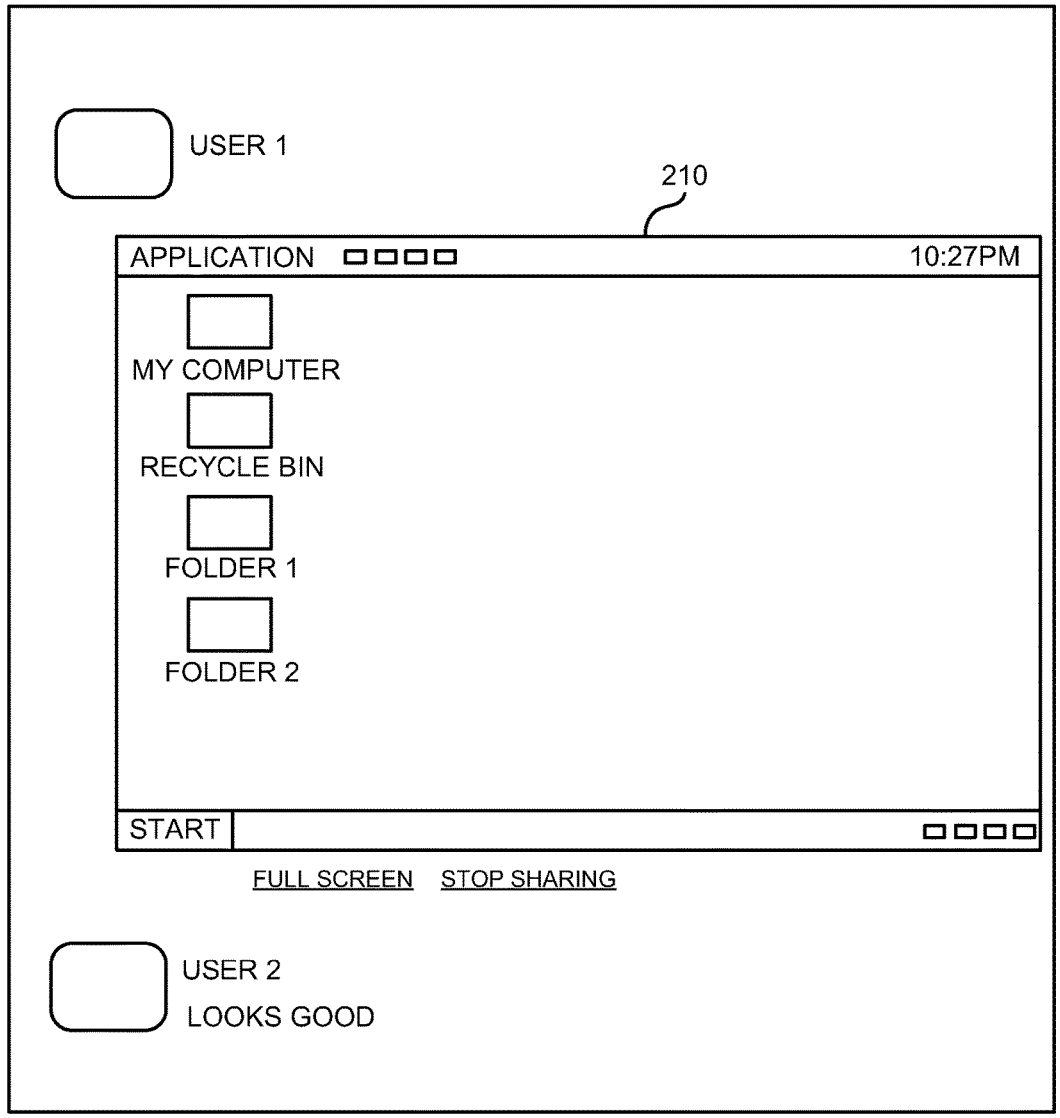
FIG. 3 is a screenshot showing a shared VM screen during a live/private online discussion between users of the social media, according to an example embodiment.

FIG. 2 illustrates a screenshot of an example shared VM screen in a social stream provided by social media application 130. FIG. 3 illustrates a screenshot of another example shared VM screen during a live/private chat/message session between users of social media application 130. The terms, "social stream" or "social feed" interchangeably refer to lists of postings by users accessing social media application 130.

Further, VM screen sharing module 140 determines whether a console access is allowed to the shared VM screen by first user 110A upon activating the shared VM screen in one of the default social feed, the feed from one of the group or the private message section of the social media by second user 110B. If the console access is allowed to the shared VM screen by first user 110A, then when the second user activates the shared VM screen, the VMRC browser plug-in 115B in client device at the second location 112B transfers the access control from the second user's screen to the shared VM screen. If the console access is not allowed to the shared VM screen by first user 110A, then when second user 110B activates the shared VM screen, VM screen sharing module 140 provides view console only option to the shared VM screen to the second user. In some embodiments, in the view console option the user can only view the screen, and cannot access the VM screen as access control is not transferred to the VM screen being shared.

Where the time duration is provided by first user 110A, VM screen sharing module 140 may limit the availability of the shared VM screen for viewing by second user 110B only up to the time duration provided by first user 110A. In some embodiments, VM screen sharing module 140 may display a message saying that the "VM screen was shared earlier" (not shown) to any user coming on to social media 130 after the expiration of the time duration provided by first user 110A to share the VM screen. In some embodiments, VMRC API 117 provides options to allow for grabbing input from mouse and keyboard or prevent the inputs from reaching the VM. The command function may be:

setInputRelease( )

The setInputRelease( ) may be configured to command the VMRC browser plug-in to disable all mouse and keyboard input capture, regardless of the current grab state. This technique may be used to lock any input from reaching the connected VM. For example, if a web application displays a modal dialog, or enters a state in which an event may need to be prevented from reaching a connected VM, the setInputRelease( ) command may call using a parameter value of true. Further, the setInputRelease( ) command may be called with a parameter value of false to revert the VMRC browser plug-in to normal input behaviour. The input grab state may then be changed using the grabInput( ) and ungrabInput( ) techniques. This is similar to the presenter and attendee mode in WebEx®.

In some embodiments, VM screen sharing module 140 provides a stop sharing button or link (shown right below the shared screen 210 in FIG. 2) that can become active when sharing the VM screen. Activating the stop sharing button may disconnect the screen and end the session. In some embodiments, social media 130 includes code to create an object instance of the VMRC browser plug-in in HTML code. The visibility of the object may be toggled using, for example, JavaScript™. The object may be made visible only upon a successful connection and hidden upon disconnecting from the VM and shutting down the VMRC browser plug-in to end sharing. In addition, in these embodiments, the connection can be automatically disconnected and shut-down after certain time duration, typically, after the certain time duration set by the user to avoid dangling sessions.

Although the above VM screen sharing via social media is described using only two users for simplicity of understanding, one can envision that the above technique can be used substantially simultaneously by any number of users to share their VM screens via social media, such as those shown in FIG. 1. Also, although certain terms are used primarily herein, other terms could be used interchangeably to yield equivalent embodiments and examples. For example, the term "physical computing system" may be used interchangeably with "physical machine" or "physical device". Further for example, the term "browser" may be used interchangeably with the term "web browser". Furthermore for example, it is well-known that equivalent terms in the field of system virtualization or similar or related fields could be substituted for such terms as "physical computer," "hypervisor," "virtual machine," or the like. The terms "CPU" and "processor" are used interchangeably throughout the document. The term "memory" refers to "physical memory". Also for example, the term "screen" may be used interchangeably with "console". Moreover for example, the term "social media" may be used interchangeably with " ", "social networks", "social media platform", and "social media communication network". In addition, the term "activating" may be used interchangeably with "clicking". Moreover, the term "social stream" may be used interchangeably with "social feed".

Numerous specific details are set forth herein, such as data formats and code sequences, and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described are not limited by the particular order, selection, or decomposition of aspects described with reference to any particular routine, module, component, or the like.

Example Processes

Figure 4A:
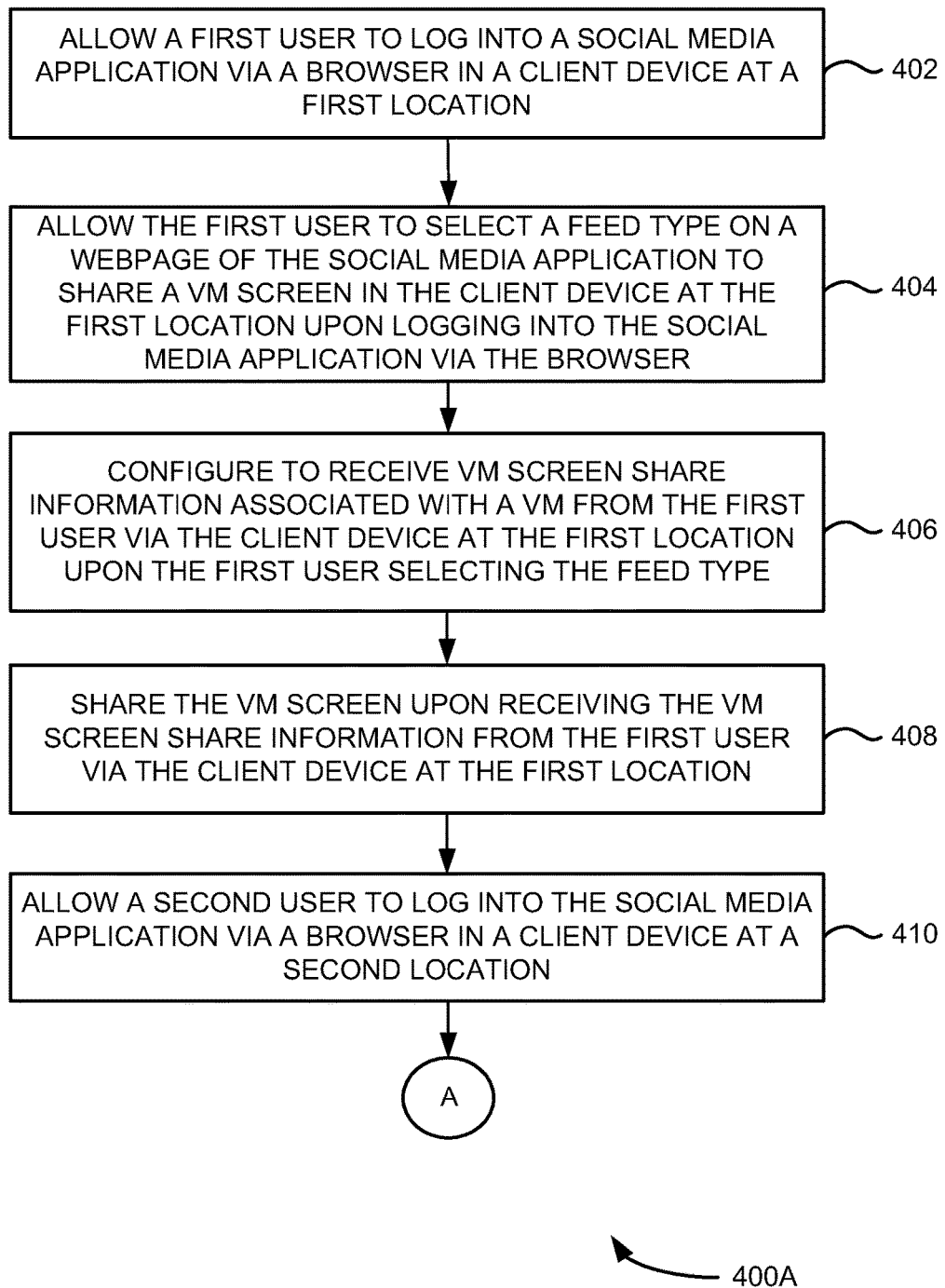
FIGS. 4A and 4B illustrate a flow diagram of a process for VM screen sharing and accessing via social media, according to an example embodiment.
Figure 4B:
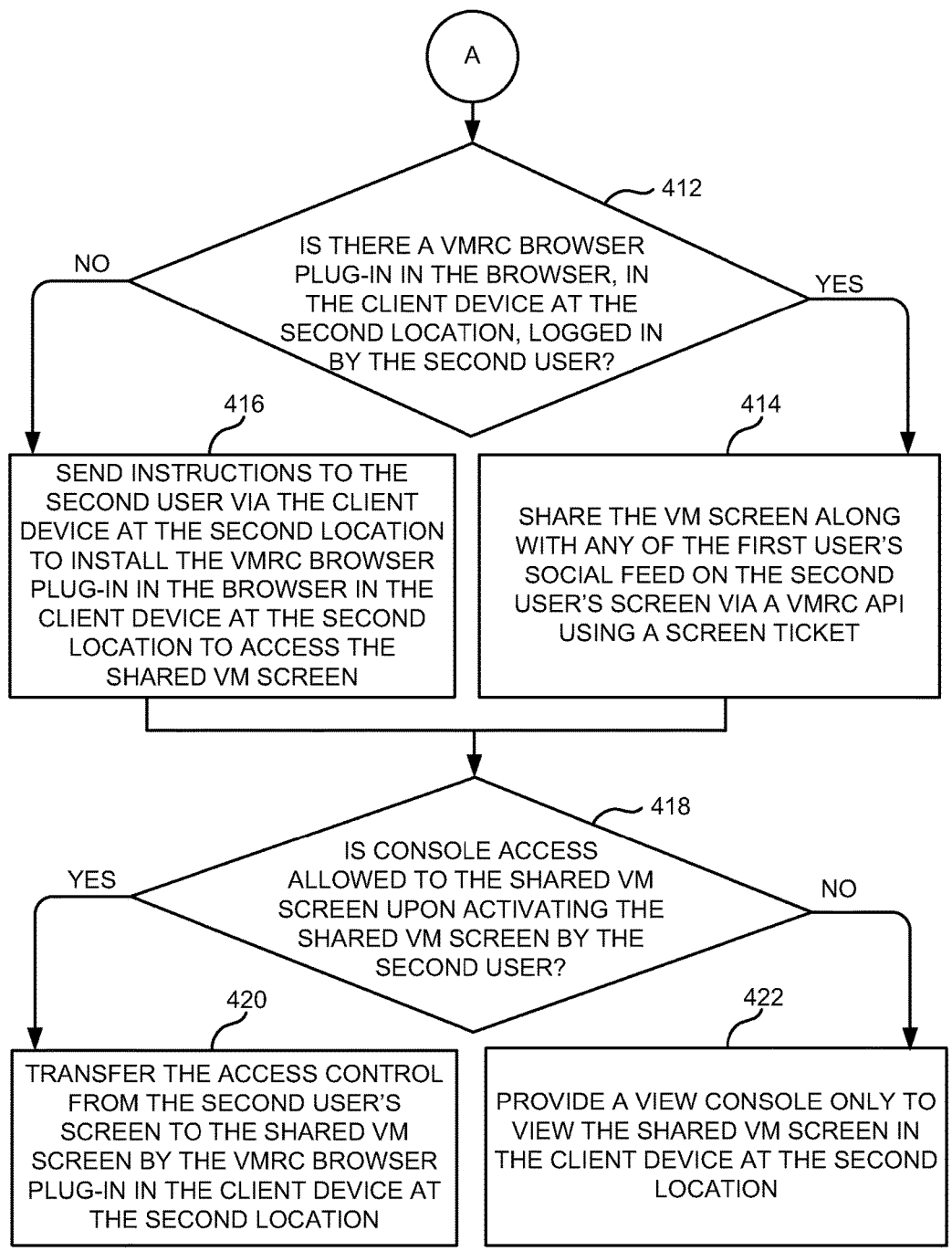

FIGS. 4A and 4B illustrate a flow diagram of a process for VM screen sharing and accessing via social media, according to an embodiment. FIGS. 4A and 4B illustrate a process 400 for VM screen sharing via social media that may be performed by, for example, one or more modules of the VMS described above. Illustrated processes 400A and 400B may be set to share and/or access a VM screen via social media.

At block 402, a first user is allowed to log into the social media application via a browser. In some embodiments, a VMRC browser plug-in in a browser of a client device at the first location may be configured to allow the first user to log into the social media via a browser. At block 404, the first user is allowed to select a feed type on a webpage of the social media application to share the VM screen upon logging into the social media application via the browser. In some embodiments, the VMRC browser plug-in may be configured to allow the first user to select a feed type to share the VM screen. Example feed type is a default social feed, a live feed and/or a feed from one of a group or a private message section of the social media.

At block 406, VM screen share information associated with the VM is received from the first user via the client device at the first location upon the first user selecting the feed type on the webpage of the social media application via the browser. In these embodiments, the user screen 200 (shown in FIG. 2) includes a stream in the feed of social media, which includes the shared VM screen 210 (shown in FIG. 2) and user contributed content. In some embodiments, the VMRC browser plug-in may be configured to allow the first user to provide VM screen share information. Example VM screen share information is VM location information, control access information, and/or time duration needed to share the VM screen. In some embodiments, a web form is provided to the first user to include the VM screen share information upon activating a share-link console link. The first user is then allowed to complete the form by entering the VM screen share information. The first user is then allowed to submit the completed form via the client device at the first location. Further in some embodiments, the VMRC browser plug-in is configured to provide a form to the first user to include the VM location information, the control access information and/or the time duration needed to share the VM screen upon activating a share-console link by the first user. In some embodiments, a pop-up including a HTML form is provided to the first user to include the VM screen share information upon activating the share-console link.

At block 408, the VM screen is shared upon receiving the VM screen share information from the first user via the client device at the first location. In some embodiments, a screen ticket is obtained from VMS. The screen ticket is then sent to the VMRC browser plug-in via a VMRC API when the first user submits the form. The VM screen is then shared upon receiving the VM screen share information from the first user and the screen ticket from the VMS.

At block 410, a second user is allowed to log into the social media via a browser in a client device at the second location. In some embodiments, the VM screen sharing module is configured to allow a second user to log into the social media via a browser in a client device at the second location. At block 412, according to the process 400 the VM screen sharing module is configured to determine whether there is a VMRC browser plug-in in the browser in the client device at the second location logged in by the second user. At block 414, based on the outcome of the determination at block 412, if there is a VMRC browser plug-in in the browser of the client device at the second location, then the VM screen is shared along with any of the first user's social feed on the second user's screen via the VMRC API using the screen ticket. At block 416, based on the determination at block 412, if there is no VMRC browser plug-in in the browser, the VM screen sharing module sends instructions to the second user via the client device at the second location to install the VMRC browser plug-in in the browser to access the shared VM screen.

At block 418, according to the process 400 VM screen sharing module is configured to determine whether a console access is allowed to the shared VM screen by the first user when the second user activates the shared VM screen in one of the default social feed, the feed from one of the group or the private message section of the social media. At block 420, based on the determination at 418, if the console access is allowed to the shared VM screen, VM screen sharing module is configured to transfer the access control from the second user's screen to the shared VM screen when the second user activates the shared VM screen via the VMRC browser plug-in. At block 422, based on the determination at 418, if the console access is not allowed to the shared VM screen, VM screen sharing module is then configured to provide a view console only, i.e., read-only access to the second user to view the shared VM screen in the client device at the second location. The read-only access may provide the second user to view the shared VM screen and not the access to the VM screen as transfer of access is not performed in this mode.

In some embodiments, a message is displayed saying that the VM screen was shared earlier to any user coming on the social media after the expiration of the time duration provided by the first user to share the VM screen.

Example Computing System Implementation

Figure 5:
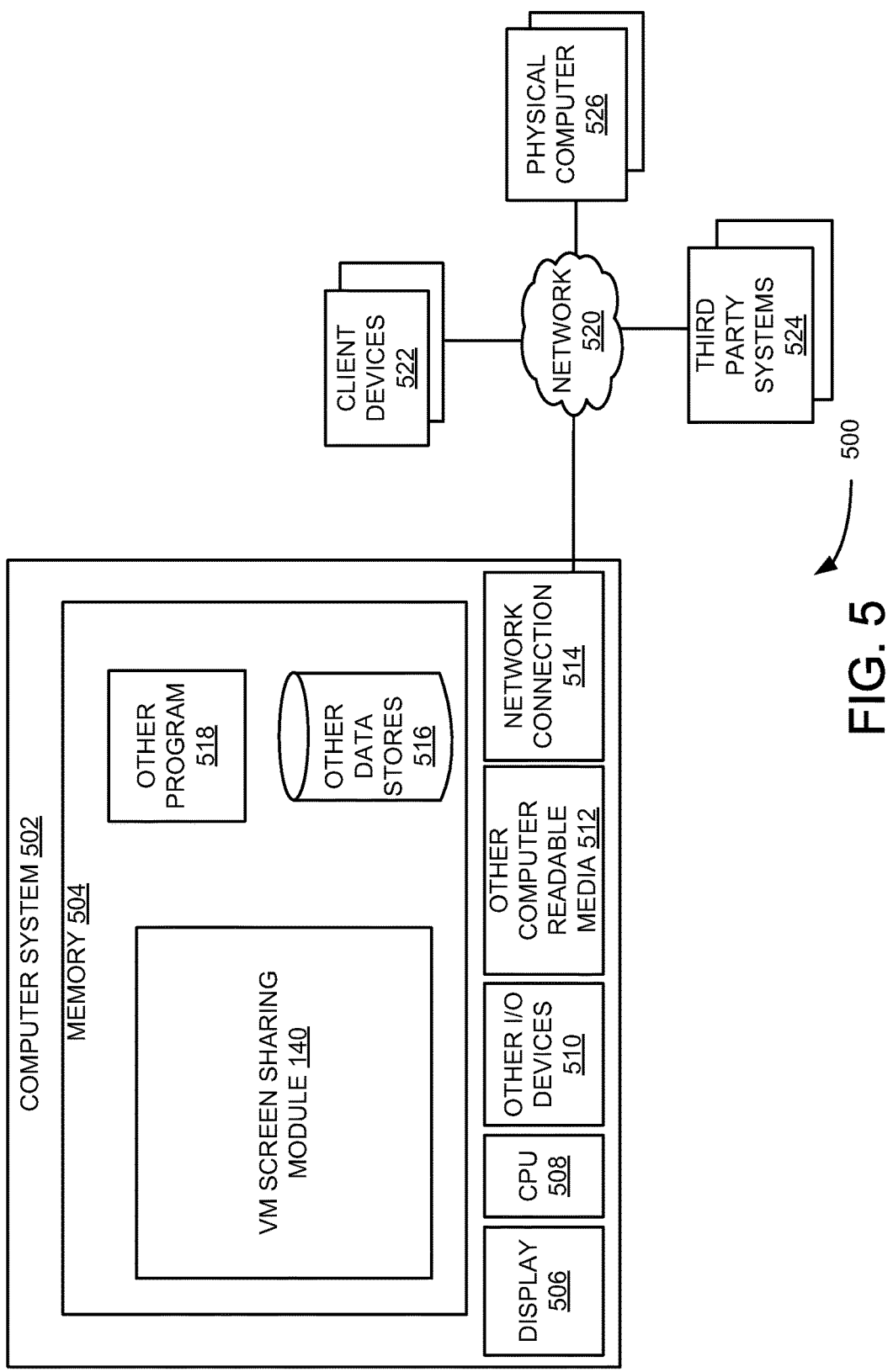
FIG. 5 is a block diagram of a computing system for implementing VM screen sharing and accessing via the social media, according to an example embodiment.

FIG. 5 is a block diagram of an example computing system 500 for sharing VM screen via social media, according to an example embodiment. In particular, FIG. 5 shows the computing system 500 that may be utilized to implement a VM screen share via social media shown in FIG. 1.

Note that one or more general purpose virtual or physical computer systems suitably instructed may be used to implement the VM screen share via social media. In addition, the computing system 500 may comprise one or more distinct computer systems/devices 502 and may span distributed locations. Furthermore, each block shown may represent one or more such blocks as appropriate to a specific embodiment or may be combined with other blocks. Also, the VM Screen share via social media of FIG. 1 may be implemented in software, hardware, firmware, or in some combination to achieve the capabilities described herein.

In the embodiment shown, computing system 500 may comprise a computer system 502. As shown in FIG. 5, computer system 502 comprise computer memory ("memory") 504, display 506, one or more Central Processing Units ("CPU") 508, Input/output devices 510 (e.g., keyboard, mouse, etc.), other computer-readable media 512, and network connections 514. VM screen sharing module 140 is shown residing in memory 504. The components of VM screen sharing module 140 may execute on one or more CPUs 506 and implement techniques described herein. Other code or programs 516 (e.g., an administrative interface, a Web server, and the like) and potentially other data repositories, such as data store 516, may also reside in memory 504, and execute on one or more CPUs 506. One or more of the components in FIG. 5 may not be present in any specific implementation. For example, some embodiments may not provide other computer readable media 512 or display 506.

The architecture shown in FIG. 5 may in some embodiments be partially or fully virtualized. For example, the computer system 500 may be one or possibly many VMs executing on physical hardware and managed by a hypervisor, virtual machine monitor, or similar technology.

In an example embodiment, components/modules of VM screen sharing module 140 are implemented using standard programming techniques. For example, VM screen sharing module 140 may be implemented as a "native" executable running on CPU 508, along with one or more static or dynamic libraries. In other embodiments, VM screen sharing module 140 may be implemented as instructions processed by a virtual machine (VM) that executes as one of the other programs 518.

Furthermore, in some embodiments, some or all of the components of VM screen sharing module 140 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Further, from the foregoing it will be appreciated that, although specific embodiments have been described herein for purposes of illustration, various modifications may be made without deviating from the spirit and scope of this disclosure. For example, the methods, techniques, and systems for sharing VM screen via social media are applicable to other architectures or in other settings.

The invention claimed is:

1. A method of sharing a virtual machine (VM) screen and providing VM access via social media, the method comprising:
   receiving an input from a first user to log into the social media application from a browser in a client device at a first location;
   receiving, after the first user logs into the social media application, an input from the first user selecting a feed type on a webpage of the social media application from a plurality of feed types, wherein the selection of a particular feed type designates a location of the social media application to share a VM screen, wherein each feed type is accessible by a particular group of users including the first user;
   receiving VM screen share information associated with the VM from the first user via the client device at the first location upon the first user selecting the feed type, wherein the VM screen share information includes a user specification of console access information specifying whether other users of the social media application are allowed to transfer access control of the VM from the first user to provide input to the shared VM screen to control the VM or are only allowed read-only access to view the shared VM screen; and
   sharing the VM screen in a user interface of the social media application for the selected feed type upon receiving the VM screen share information from the first user via the client device at the first location, wherein the shared VM screen is available to one or more second users of the selected feed type within an interface of the social media application, and wherein the selected feed type provides a message feed configured to present the shared VM screen from the first user as a message post in the message feed and to present user supplied content in the interface including one or more text message posts of a social stream from the first user and one or more second users within the message feed of the social media application in addition to the shared VM screen, and wherein console access allowing input to the VM by the one or more second users to the VM through interaction with the shared VM screen presented in the message feed of the social media application is based on the user specified console access information.

2. The method of claim 1, wherein sharing the VM screen upon receiving the VM screen sharing information comprises:
  obtaining a screen ticket from virtual management software (VMS);
  sending the screen ticket onto a virtual machine remote console (VMRC) browser plug-in via a VMRC application programming interface (API); and
  sharing the VM screen upon receiving the VM screen share information from the first user and the screen ticket from the VMS.

3. The method of claim 2, further comprising:
  receiving an input from a second user to log into the social media application from a browser in a second client device at a second location;
  determining whether there is a VMRC browser plug-in in the browser in the client device at the second location logged in by the second user;
  if there is VMRC browser plug-in in the browser of the client device at the second location, sharing the VM screen along with any of the first user's social feed on the second client device screen via the VMRC API using the screen ticket; and
  if there is no VMRC browser plug-in in the browser of the client device at the second location, sending instructions to the second user via the client device at the second location to install the VMRC browser plug-in in the browser in the client device at the second location to access the shared VM screen.

4. The method of claim 2, wherein configuring to receive VM screen share information from the first user comprises:
  providing a form to the first user to include the VM screen share information upon activating a share-console link; and
  receiving input from the first user submitting the completed form including the VM screen share information via the client device at a first location to share the VM screen in the selected one of default social feed, feed from one of the group, or private message section of the social media.

5. The method of claim 1, wherein the feed type is a default social feed, a live feed and/or a feed from one of a group or a private message section of the social media.

6. The method of claim 4, further comprising:
  determining whether console access is allowed to the shared VM screen upon activating the shared VM screen in one of the default social feed, the feed from one of the group or the private message section of the social media by the second user;
  if the console access is allowed to the shared VM screen, transferring the access control from the second user's screen to the shared VM screen by the VMRC browser plug-in in the client device at the second location; and
  if the console access is not allowed to the shared VM screen, allowing the second user to only view the console of the shared VM screen in the client device at the second location.

7. The method of claim 4, wherein the VM screen share information comprises VM location information, the control access information, and/or a time duration to share the VM screen.

8. The method of claim 7, wherein the VM location information comprise information selected from the group consisting of a VM name, a VMS host name or an internet protocol (IP) address, an organization name, a username and a password for the VMS.

9. The method of claim 7, wherein the control access information comprises view console only or view and access console.

10. The method of claim 7, wherein the shared VM screen is available for viewing by the second user only up to the time duration provided by the first user.

11. The method of claim 10, further comprising:
  displaying a message that the VM screen was shared earlier to any user coming on to the social media after expiration of the time duration provided by the first user to share the VM screen.

12. The method of claim 7, wherein providing the form to the first user to include the VM location information, the control access information, and the time duration to share upon activating the share-console link comprises:
  providing a pop-up including a hypertext markup language (HTML) form to the first user to include the VM location information, the control access information, and the time duration to share upon activating the share-console link.

13. A non-transitory computer-readable storage medium including instructions that are configured, when executed by a computing system, to perform a method of sharing a VM screen and providing VM access via social media, the method comprising:
  receiving an input from a first user to log into the social media application from a browser in a client device at a first location;
  receiving, after the first user logs into the social media application, an input from the first user selecting a feed type on a webpage of the social media application from a plurality of feed types, wherein the selection of a particular feed type designates a location of the social media application to share a VM screen location, wherein each feed type is accessible by a particular group of users including the first user;
  receiving VM screen share information associated with the VM from the first user via the client device at the first location upon the first user selecting the feed type, wherein the VM screen share information includes a user specification of console access information specifying whether other users of the social media application are allowed to transfer access control of the VM from the first user to provide input to the shared VM screen to control the VM or are only allowed read-only access to view the shared VM screen; and
  sharing the VM screen in a user interface of the social media application for the selected feed type upon receiving the VM screen share information from the first user via the client device at the first location, wherein the shared VM screen is available to one or more second users of the selected feed type within an interface of the social media application, and wherein the selected feed type provides a message feed configured to present the shared VM screen from the first user as a message post in the message feed and to present user supplied content in the interface including one or more text message posts of a social stream from the first user and one or more second users within the message fed of the social media application in addition to the shared VM screen, and wherein console access allowing input to the VM by the one or more second users to the VM through interaction with the shared VM screen presented in the message feed of the social media application is based on the user specified console access information.

14. The computer-readable storage medium of claim 13, wherein sharing the VM screen upon receiving the VM screen sharing information comprises:
  obtaining a screen ticket from virtual management software (VMS);
  sending the screen ticket onto a virtual machine remote console (VMRC) browser plug-in via a VMRC application programming interface (API); and
  sharing the VM screen upon receiving the VM screen share information from the first user and the screen ticket from the VMS.

15. The computer-readable storage medium of claim 14, further comprising:
  receiving an input from a second user to log into the social media application from a browser in a second client device at a second location;
  determining whether there is a VMRC browser plug-in in the browser in the client device logged in by the second user;
  if there is VMRC browser plug-in in the browser of the client device at the second location, sharing the VM screen along with any of the first user's social feed on the second client device screen via the VMRC API using the screen ticket; and
  if there is no VMRC browser plug-in in the browser of the client device at the second location, sending instructions to the second user via the client device at the second location to install the VMRC browser plug-in in the browser in the client device at the second location to access the shared VM screen.

16. The computer-readable storage medium of claim 15, wherein configuring to receive the VM screen share information from the first user comprises:
  providing a form to the first user to include the VM screen share information upon activating a share-console link; and
  receiving input from the first user submitting the completed form including the VM screen share information via the client device at the first location to share the VM screen in the selected one of default social feed, feed from one of the group or private message section of the social media.

17. The computer-readable storage medium of claim 13, wherein the feed type is a default social feed, a live feed and/or a feed from one of a group or a private message section of the social media.

18. The computer-readable storage medium of claim 15, further comprising:
  determining whether console access is allowed to the shared VM screen upon activating the shared VM screen in one of the default social feed, the feed from one of the group or the private message section of the social media by the second user;
  if the console access is allowed to the shared VM screen, transferring the access control from the second user's screen to the shared VM screen by the VMRC browser plug-in in the client device at the second location; and
  if the console access is not allowed to the shared VM screen, allowing the second user to only view the console of the shared VM screen in the client device at the second location.

19. A system for sharing a virtual machine (VM) screen and providing VM access via social media, comprising:
  host computing systems, wherein each host computing system hosting multiple VMs;
  a virtual management server communicatively coupled to the host computing systems, wherein the virtual management server comprising virtualization management software (VMS); and
  a client device at a first location associated with a first user and a client device at a second location associated with a second user, and wherein each of the client device at the first location and the client device at the second location includes associated VMRC-browser plug-ins, and
  wherein the client device at the first location and the client device at the second location configured to access a social medial application via Internet/Intranet, wherein the social media application, including a VM screen sharing module, and that is configured to:
    allow a first user to log into the social media application via a browser in a client device at a first location;
    receive an input from the first user to select a feed type on a webpage of the social media application from a plurality of feed types, wherein the selection of a particular feed type designates a location of the social media application to share a VM screen, wherein each feed type is accessible by a particular group of users including the first user;
    receive VM screen share information associated with the VM from the first user via the client device at the first location upon the first user selecting the feed type, wherein the VM screen share information includes a user specification of console access information specifying whether other users of the social media application are allowed to transfer access control of the VM from the first user to provide input to the shared VM screen to control the VM or are only allowed read-only access to view the shared VM screen; and
    share the VM screen in a user interface of the social media application for the selected feed type upon receiving the VM screen share information from the first user via the client device at the first location, wherein the shared VM screen is available to one or more second users of the selected feed type within an interface of the social media application, and wherein the selected feed type provides a message feed configured to present the shared VM screen from the first user as a message post in the message feed and to present user supplied content including one or more text message posts of a social stream from the first user and one or more second users within the message feed of the social media application in addition to the shared VM screen, and wherein console access allowing input to the VM by the one or more second users to the VM through interaction with the shared VM screen presented in the message feed of the social media application is based on the user specified console access information.

20. The system of claim 19, wherein the VM screen share module is configured to:
  obtain a screen ticket from virtual management software (VMS);
  send the screen ticket onto a virtual machine remote console (VMRC) browser plug-in via a VMRC application programming interface (API); and
  share the VM screen upon receiving the VM screen share information and the screen ticket from the first user.

21. The system of claim 20, wherein the VM screen share module is further configured to:

receive an input from a second user to log into the social media application via a browser in a second client device at the second location;

determine whether there is a VMRC browser plug-in in the browser in the client device at the second location logged in by the second user;

share the VM screen along with any of the first user's social feed on the second client device screen via the VMRC API using the screen ticket, if there is VMRC browser plug-in in the browser of the client device at the second location; and send instructions to the second user via the client device at the second location to install the VMRC browser plug-in in the browser in the client device at the second location to access the shared VM screen, if there is no VMRC browser plug-in in the browser of the client device at the second location.

22. The system of claim 20, wherein the VM screen sharing module is configured to:

provide a form to the first user to include the VM screen share information upon activating a share-console link; and receive input from the first user submitting the completed form including the VM screen share information via the client device at the first location to share the VM screen in the selected one of default social feed, feed from one of the group or private message section of the social media.

23. The system of claim 19, wherein the feed type is a default social feed, a live feed and/or a feed from one of a group or a private message section of the social media.

24. The system of claim 22, wherein the VM screen share module is further configured to:

determine whether console access is allowed to the shared VM screen upon activating the shared VM screen in one of the default social feed, the feed from one of the group or the private message section of the social media by the second user;

transfer the access control from the second user's screen to the shared VM screen by the VMRC browser plug-in in the client device at the second location when the second user activates anywhere on the screen of the client device at the second location, if the console access is allowed to the shared VM screen; and configure the social media to provide a view console only to view the shared VM screen to the second user in the client device at the second location, if the console access is not allowed to the shared VM screen.

25. The system of claim 22, wherein the VM screen share information comprises VM location information, the control access information, and/or a time duration to share the VM screen.

26. The system of claim 25, wherein the VM location information comprise information selected from the group consisting of a VM name, a VMS host name or an internet protocol (IP) address, an organization name, a username and a password for the VMS.

27. The system of claim 25, wherein the control access information comprises view console only or view and access console.

28. The system of claim 25, wherein the shared VM screen is available for viewing by the second user only up to the time duration provided by the first user.

29. The system of claim 28, wherein the VM screen sharing module is further configured to:

display a message that the VM screen was shared earlier to any user coming on to the social media after expiration of the time duration to share the VM screen provided by the first user.

30. The system of claim 25, wherein the VM screen sharing module is further configured to:

provide a pop-up including a hypertext markup language (HTML) form to the first user to include the VM location information, the control access information, and the time duration to share upon activating the share-console link.

31. The method of claim 1, wherein responsive to the console access information specifying that other users are allowed to provide input to the VM, transferring access control to the shared VM screen allowing input to the VM using the shared VM screen.

* * * * *